United States Patent
Hegde et al.

(10) Patent No.: US 12,306,710 B2
(45) Date of Patent: May 20, 2025

(54) EARLY DETECTION OF ROOM TEMPERATURE DATA RETENTION PHENOMENA

(71) Applicant: Western Digital Technologies, Inc., San Jose, CA (US)

(72) Inventors: Pradeep Hegde, Bangalore (IN); Akhilesh Yadav, Bangalore (IN); Shivam Mishra, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 25 days.

(21) Appl. No.: 18/449,491

(22) Filed: Aug. 14, 2023

(65) Prior Publication Data
US 2024/0419535 A1   Dec. 19, 2024

Related U.S. Application Data

(60) Provisional application No. 63/508,988, filed on Jun. 19, 2023.

(51) Int. Cl.
*G06F 11/10* (2006.01)
(52) U.S. Cl.
CPC .................... *G06F 11/10* (2013.01)
(58) Field of Classification Search
CPC ............ G06F 11/10; G01R 31/3171; G11B 2020/185; H03M 13/1102; H03M 13/1151; H03M 13/1154; H03M 13/255; G11C 16/34
USPC ................ 714/721, 763, 759, 800
See application file for complete search history.

(56) References Cited

U.S. PATENT DOCUMENTS

| | | | | |
|---|---|---|---|---|
| 10,811,075 B1* | 10/2020 | Cheng | ................ | G11C 11/40603 |
| 2009/0020831 A1* | 1/2009 | Ramkumar | ....... | H01L 29/40117 |
| | | | | 257/E29.345 |
| 2014/0225116 A1* | 8/2014 | Ramkumar | ....... | H01L 29/40117 |
| | | | | 257/66 |
| 2016/0004464 A1* | 1/2016 | Shen | ..................... | G06F 3/0659 |
| | | | | 711/103 |
| 2019/0279735 A1* | 9/2019 | Zeng | .................... | G11C 11/5642 |
| 2020/0066353 A1* | 2/2020 | Pletka | ................... | G06F 3/0604 |
| 2020/0117389 A1* | 4/2020 | Kang | .................... | G06F 3/0656 |
| 2022/0011967 A1* | 1/2022 | Mekhanik | ............... | G11C 29/50 |

(Continued)

*Primary Examiner* — Albert Decady
*Assistant Examiner* — Osman M Alshack
(74) *Attorney, Agent, or Firm* — Michael Best & Friedrich LLP

(57) ABSTRACT

Early detection of Room Temperature Data Retention (RTDR) phenomena in programmed metablocks of data storage devices. In one embodiment, a memory controller includes a memory interface configured to interface with a non-volatile memory and a controller. The controller is configured to program a metablock of the non-volatile memory. Programming the metablock includes assigning the metablock to one of a plurality of thermal region tags ("TRTs") associated with a respective one of a plurality of thermal regions. Each TRT is associated with a respective set of read parameters. The controller is further configured to perform a periodic TRT update to detect a RTDR phenomena associated with the metablock. In response to determining that the threshold associated with the detection of a RTDR phenomena has been exceeded, the controller reassigns the metablock to a different one of the TRTs.

17 Claims, 7 Drawing Sheets

(56) References Cited

U.S. PATENT DOCUMENTS

| | | | |
|---|---|---|---|
| 2022/0075687 A1* | 3/2022 | Jain | G06F 11/1068 |
| 2022/0113894 A1* | 4/2022 | Avraham | G11C 29/021 |
| 2023/0012093 A1* | 1/2023 | Kakushima | H10B 10/18 |
| 2023/0410901 A1* | 12/2023 | Moon | G11C 11/5671 |

* cited by examiner

EARLY DETECTION OF ROOM TEMPERATURE DATA RETENTION PHENOMENA

CROSS-REFERENCE TO RELATED APPLICATION

This application claims priority to and the benefit of U.S. Provisional Patent Application No. 63/508,988, filed on Jun. 19, 2023, the entire contents of which is incorporated herein by reference.

FIELD

This application relates generally to data storage devices and, more particularly, to low-density parity-check (LDPC) coding based on memory cell voltage distribution (CVD) in data storage devices.

SUMMARY

In complex data storage devices, high frequency noise (e.g., drift in analog parameters such as clock jitter, shift in the memory cells and other temperature related parameters) may be relatively easy to filter out. However, filtering out low frequency noise, drift in the programmed cell voltage, and other analog parameters can be very difficult.

The structure of a memory (e.g., memory cells, word lines, blocks, dies, etc.), the condition of the memory (e.g., temperature when reading, temperature when programming, data retention, etc.), and the operational mode of the memory (e.g., read failure recover, read threshold voltage calibration, etc.) can each affect the ability of a controller to efficiently and effectively read data from the memory cells. Temperature is particularly problematic for flash memory cells because each cell can potentially exhibit different shifts in threshold voltages due to each cell having a distinct cross temperature coefficient. Additionally, room temperature shifts may be slow but continue over time.

Voltage shift in programmed memory cells (e.g., NAND memory cells) is often not detectable using thresholds configured to filter higher frequency voltage shifts due to cross temperature or aging. Failure to detect voltage shifts may lead to device performance issues or temporary failure of the device. For example, when a flash memory cell's read threshold voltages have shifted, attempting to determine the programmed state or bit sequence of the flash memory cell using inaccurate read threshold voltages may result in an increased bit error rate ("BER"). To reduce BER and more accurately determine the programmed state of the flash memory cell, a controller may adjust or modify the read threshold voltages that are used to determine the programmed state of the flash memory cell. While algorithms to correct voltage shifts exist, there is no method to detect voltage shift early enough to adjust the voltage shift on-demand before the host reads the data.

Thus, there is a need to detect the effects of room temperature data retention ("RTDR") phenomena, which has relatively slow CVD shifts compared to high temperature data retention ("HTDR") phenomena, on a memory storage system running for long periods of time under the same temperature regions. More specifically, there is a need to distinguish between recently closed metablocks with minimal CVD shifts and metablocks closed at period of time exceeding a temporal threshold, for example, approximately five to six weeks when the effects of RTDR phenomena have begun. When the metablock population is not properly split, the system may experience a performance drop and suboptimal read levels for mixed metablock populations Thus, the disclosure provides a memory controller, comprising: a memory interface configured to interface with a non-volatile memory; and a controller configured to: select a metablock of the non-volatile memory to program, program the metablock, wherein programming the metablock includes assigning the metablock to one of a plurality of thermal region tags ("TRTs") associated with a respective one of a plurality of thermal regions, and each TRT of the plurality of TRTs is associated with a respective set of read parameters, perform a periodic TRT update to detect a room temperature data retention ("RTDR") phenomena associated with the metablock, wherein the periodic TRT update includes: determining whether a threshold associated with a detection of a RTDR phenomena has been exceeded, and in response to determining that the threshold associated with the detection of a RTDR phenomena has been exceeded, reassigning the metablock to a different one of the plurality of TRTs associated with a respective different one of the plurality of thermal regions, in response to receiving a read request for the metablock from an external electronic device, read the metablock using the respective set of read parameters associated with a TRT to which the metablock is assigned.

In some aspects, to perform the periodic TRT update, the controller is further configured to: determine whether a temporal threshold associated with a period of time after programming of the metablock has been exceeded, wherein the temporal threshold corresponds to a shift in a cell voltage distribution ("CVD") of the metablock.

In some aspects, to perform the periodic TRT update, the controller is further configured to: determine a bit error rate ("BER") associated with the metablock, determine a change in the BER from a previously determined BER associated with the metablock, in response to determining that the temporal threshold has been exceeded, update a counter based on the change in the BER from the previously determined BER, and determine whether the counter exceeds a count threshold, wherein the count threshold is the threshold associated with detection of the RTDR phenomena.

In some aspects, to update the counter based on the change in the BER from the previously determined BER, the controller is further configured to: determine whether the change in the BER from the previously determined BER exceeds a BER change threshold, and in response to determining that the change in the BER from the previously determined BER exceeds the BER change threshold, increment the counter.

In some aspects, to determine whether the temporal threshold has been exceeded, the controller is further configured to: determine a function of the change in the BER of the metablock over time, determine a first derivative of the function, determine a second derivative of the function, and determine whether a local maximum of the second derivative has occurred, wherein the local maximum is indicative of the temporal threshold.

In some aspects, the function is defined as: $f(x)=1/(1+\exp(-a*x))$, where 'a' is a constant indicative of a periodic change in BER of the metablock.

In some aspects, to determine whether the temporal threshold has been exceeded, the controller is further configured to: determine an amount of time elapsed since a programming of the metablock, and determine whether the amount of time elapsed since the programming of the metablock has exceeded the temporal threshold, wherein the temporal threshold is a predetermined value.

In some aspects, the temporal threshold is stored in a lookup table ("LUT").

Another example provides a method performed by a data storage device, the method comprising: selecting a metablock of a non-volatile memory to program; programing the metablock, wherein programming the metablock includes assigning the metablock to one of a plurality of thermal region tags ("TRTs") associated with a respective one of a plurality of thermal regions, and each TRT of the plurality of TRTs is associated with a respective set of read parameters; performing a periodic TRT update to detect a room temperature data retention ("RTDR") phenomena associated with the metablock, wherein performing the periodic TRT update includes: determining whether a threshold associated with a detection of a RTDR phenomena has been exceeded, and in response to determining that the threshold associated with the detection of a RTDR phenomena has been exceeded, reassigning the metablock to a different one of the plurality of TRTs associated with a respective different one of the plurality of thermal regions; and in response to receiving a read request for the metablock from an external electronic device, reading the metablock using the respective set of read parameters associated with a TRT to which the metablock is assigned.

In some aspects, performing the periodic TRT update further includes: determining whether a temporal threshold associated with a period of time after programming of the metablock has been exceeded, wherein the temporal threshold corresponds to a shift in a cell voltage distribution ("CVD") of the metablock.

In some aspects, performing the periodic TRT update further includes: determining a bit error rate ("BER") associated with the metablock, determining a change in the BER from a previously determined BER associated with the metablock, in response to determining that the temporal threshold has been exceeded, updating a counter based on the change in the BER from the previously determined BER, and determining whether the counter exceeds a count threshold, wherein the count threshold is the threshold associated with detection of the RTDR phenomena.

In some aspects, updating the counter based on the change in the BER from the previously determined BER includes: determining whether the change in the BER from the previously determined BER exceeds a BER change threshold, and in response to determining that the change in the BER from the previously determined BER exceeds the BER change threshold, incrementing the counter.

In some aspects, determining whether the temporal threshold has been exceeded includes: determining a function of the change in the BER of the metablock over time, determining a first derivative of the function, determining a second derivative of the function, and determining whether a local maximum of the second derivative has occurred, wherein the local maximum is indicative of the temporal threshold.

In some aspects, determining whether the temporal threshold has been exceeded includes: determining a function of the change in the BER of the metablock over time, determining a first derivative of the function, determining a second derivative of the function, and determining whether a local maximum of the second derivative has occurred, wherein the local maximum is indicative of the temporal threshold.

In some aspects, the function is defined as: $f(x)=1/(1+\exp(-a*x))$, where 'a' is a constant indicative of a periodic change in BER of the metablock.

In some aspects, determining whether the temporal threshold has been exceeded includes: determining an amount of time elapsed since a programming of the metablock, and determining whether the amount of time elapsed since the programming of the metablock has exceeded the temporal threshold, wherein the temporal threshold is a predetermined value.

In some aspects, the temporal threshold is stored in a lookup table ("LUT").

Another example provides an apparatus comprising: means for selecting a metablock of a non-volatile memory to program; means for programing the metablock, wherein programming the metablock includes assigning the metablock to one of a plurality of thermal region tags ("TRTs") associated with a respective one of a plurality of thermal regions, and each TRT of the plurality of TRTs is associated with a respective set of read parameters; means for performing a periodic TRT update to detect a room temperature data retention ("RTDR") phenomena associated with the metablock, wherein performing the periodic TRT update includes: determining whether a threshold associated with a detection of a RTDR phenomena has been exceeded, and in response to determining that the threshold associated with the detection of a RTDR phenomena has been exceeded, reassigning the metablock to a different one of the plurality of TRTs associated with a respective different one of the plurality of thermal regions; and means for, in response to receiving a read request for the metablock from an external electronic device, reading the metablock using the respective set of read parameters associated with a TRT to which the metablock is assigned.

In some aspects, performing the periodic TRT update further includes: determining whether a temporal threshold associated with a period of time after programming of the metablock has been exceeded, wherein the temporal threshold corresponds to a shift in a cell voltage distribution ("CVD") of the metablock.

In some aspects, performing the periodic TRT update further includes: determining a bit error rate ("BER") associated with the metablock, determining a change in the BER from a previously determined BER associated with the metablock, in response to determining that the temporal threshold has been exceeded, updating a counter based on the change in the BER from the previously determined BER, and determining whether the counter exceeds a count threshold, wherein the count threshold is the threshold associated with detection of the RTDR phenomena.

In some aspects, updating the counter based on the change in the BER from the previously determined BER includes: determining whether the change in the BER from the previously determined BER exceeds a BER change threshold, and in response to determining that the change in the BER from the previously determined BER exceeds the BER change threshold, incrementing the counter.

Other aspects of the invention will become apparent by consideration of the detailed description and accompanying drawings.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, MRAM, etc.

Figure 1:
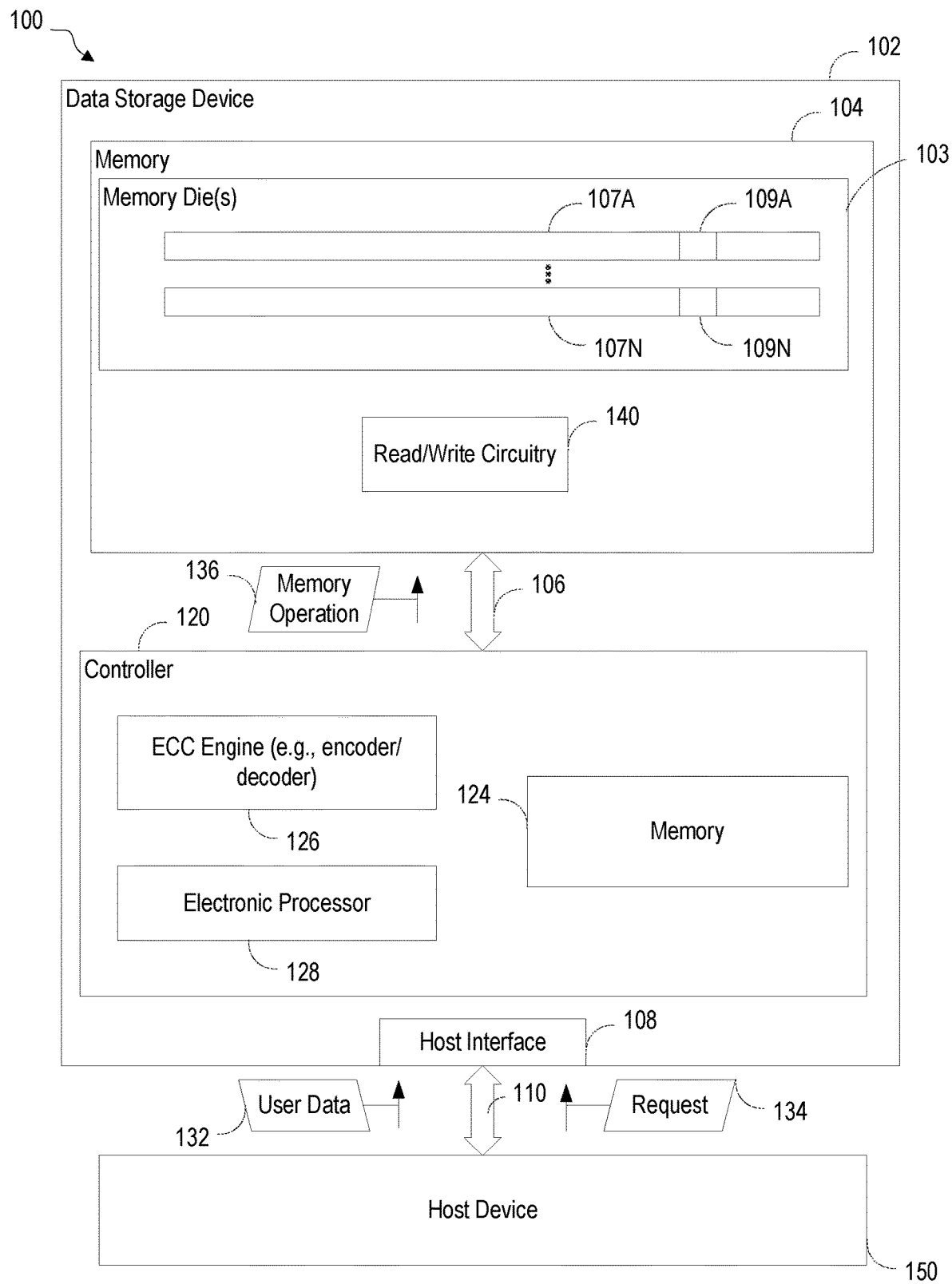
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively. Data from the host may be written to one or more metablocks. A metablock may be selected from the one or more blocks spanning across multiple planes. The pages of the one or more blocks may be grouped together and referred to as a metapage.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies. For example, the read/write circuitry 140 may be configured to perform various read/write operations such as initial writing to volatile memory, array commit functions, and other functions as required for a given application.

The data storage device 102 includes the data storage device controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150. For example, the data storage device controller 120 may send data to the host device 150 via the interface 108, and the data storage device controller 120 may receive data from the host device 150 via the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include at least one memory 124 (for example, at least one random access memory ("RAM"), at least one read-only memory ("ROM"), at least one non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128 for performing, among other things, the methods described herein.

Additionally, although the data storage device controller 120 is illustrated in FIG. 1 as including the at least one memory 124, in other implementations, some or all of the at least one memory 124 is instead located separate from the data storage device controller 120 and executable by the electronic processor 128 or a different electronic processor that is external to the data storage device controller 120 and/or the data storage device 102. For example, the at least one memory 124 may include dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

Figure 2:
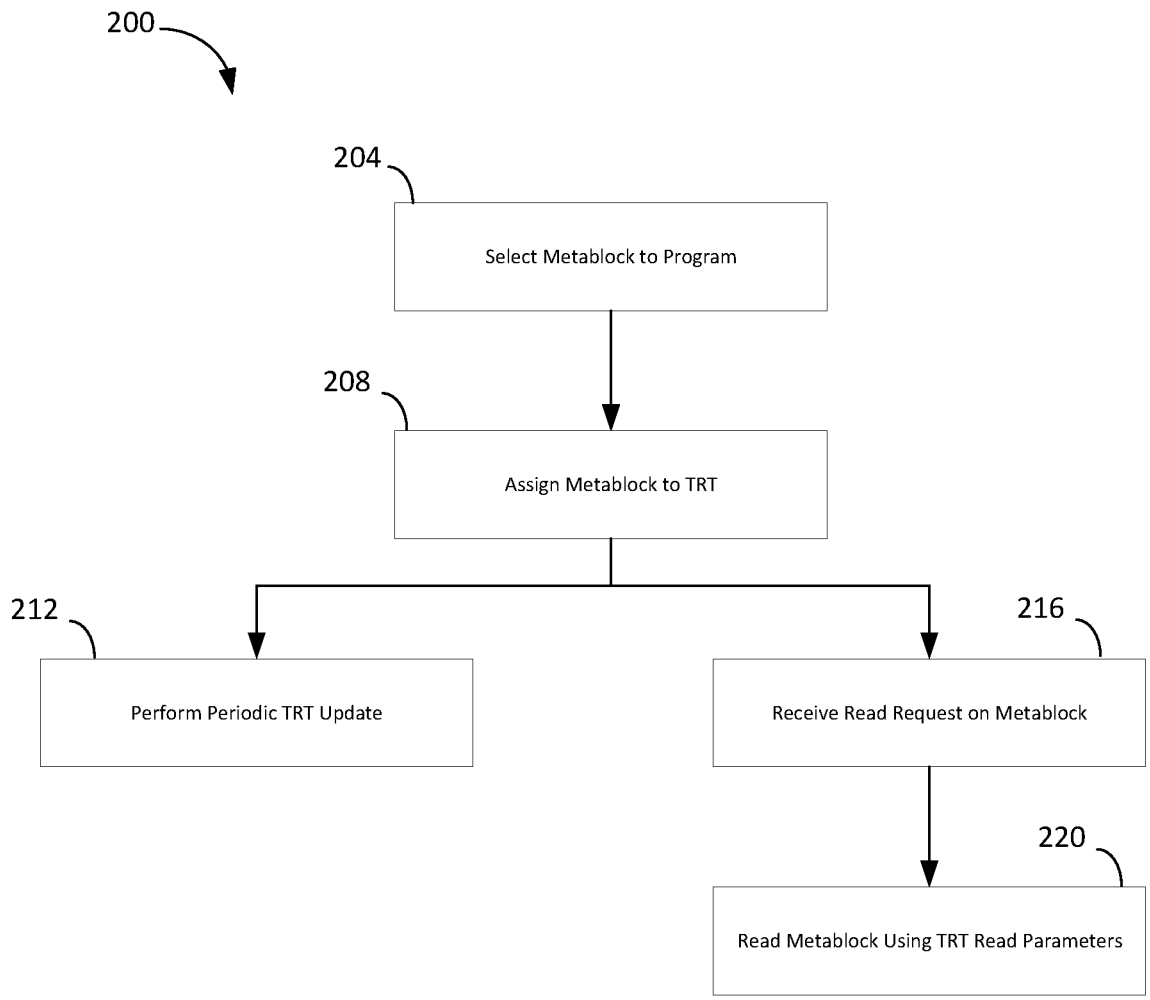
FIG. 2 is a flowchart illustrating a method of programming and reading a metablock of a memory, in accordance with some embodiments of the disclosure.

FIG. 2 is a flowchart illustrating an example method 200 for programming and reading a metablock using a set of read parameters. The method 200 is described with respect to the data storage device controller 120 of FIG. 1. While FIG. 2 illustrates a particular order of the method 200, in some embodiments, the method 200 may be performed in a different order.

As illustrated in FIG. 2, the method 200 includes selecting, with the device controller 120, selecting a metablock to program, for example in response to a command from the host device 150 (at block 204). The method 200 includes programming the metablock, where programming the metablock includes assigning the metablock to a one of a plurality of thermal region tags ("TRTs") associated with a respective one of a plurality of thermal regions (at block 208). The plurality of thermal regions includes at least two thermal regions, and may include more than two thermal regions (e.g., three thermal regions, four thermal regions, etc.). The device controller 120 may select one of the plurality of thermal regions based on a NAND temperature associated with the metablock to be programmed, or "closed."

Figure 3:
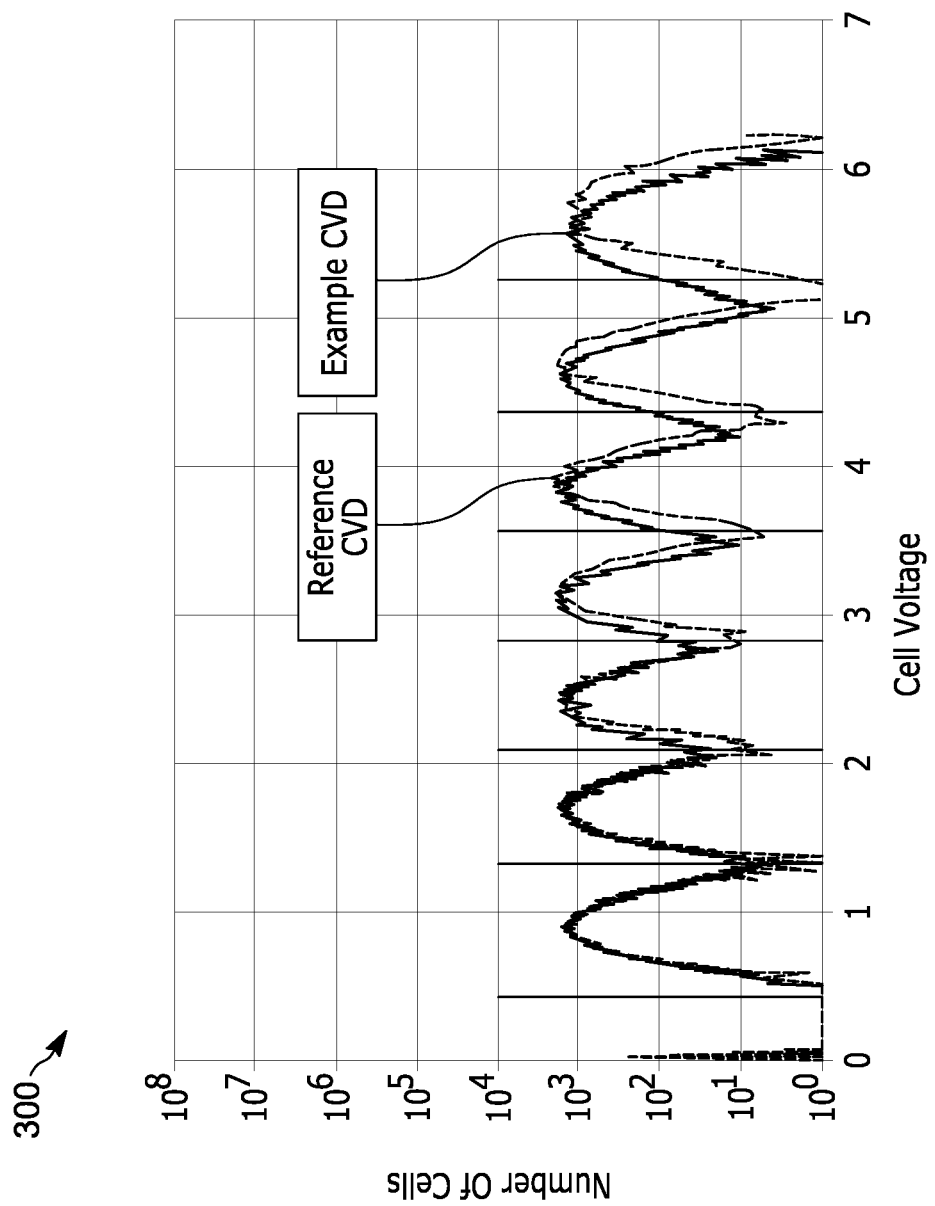
FIG. 3 is a graph illustrating a cell voltage distribution of a memory, in accordance with some embodiments of the disclosure.

Each TRT of the plurality of TRTs is associated with a set of read parameters (for example, including a CVD read threshold) for reading the closed metablock, and each set of read parameters may be different from one another. As described above, CVD shifts due to RTDR phenomena occur slowly and continuously over time. For example, FIG. 3 illustrates a graph 300 of an example CVD for a memory 104 and a reference CVD for the memory 104. The graph 300 includes an x-axis representing the gate voltage values of a plurality of memory cell states and a y-axis representing a number of cells at the respective gate voltage.

As illustrated in the graph 300, at a point in time approximately 12 days after metablock closure, a significant CVD shift to the left of the reference CVD develops for the metablock due to RTDR phenomena. CVD shifts result in increasing bit error rate ("BER") for respective metablocks. As a CVD shift grows over time, and the resulting BER increases, the CVD shift ultimately leads to a low density parity check ("LDPC") decode failure on the programmed metablock. For example, read parameters (e.g., CVD read thresholds) for the metablock must be shifted to account for the CVD shift caused by RTDR phenomena.

Figure 4:
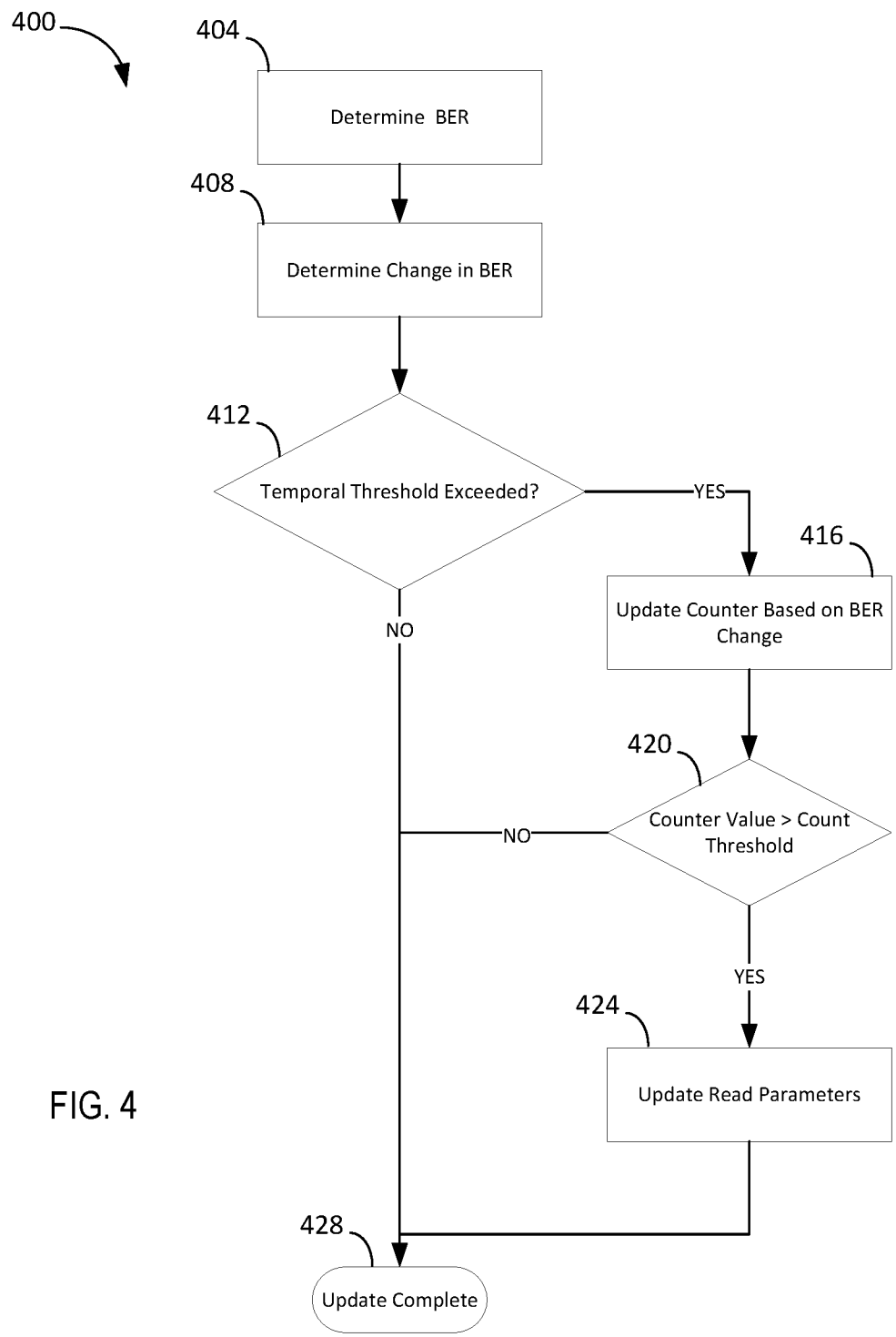
FIG. 4 is a flowchart illustrating a method of performing a periodic thermal region tag update for a metablock of a memory, in accordance with some embodiments of the disclosure.

Referring again to FIG. 2, in conventional memory devices, RTDR phenomena is only detected after in response to a LDPC decode failure. Therefore, the method 200 includes performing, with the device controller 120, a periodic TRT update for the closed metablock (at block 212). The periodic TRT update enables the device controller 120 to detect RTDR phenomena and update read parameters associated with the TRT to which the metablock is assigned prior to LDPC decode failure. For example, FIG. 4 is a flowchart illustrating an example method 400 for performing the periodic TRT update. The method 400 is described with respect to the data storage device controller 120 of FIG. 1. While FIG. 4 illustrates a particular order of the method 400, in some embodiments, the method 400 may be performed in a different order.

The method 400 includes determining, with the device controller 120, a BER associated with the metablock (at block 404). The method 400 includes determining, with the device controller 120, a change in the BER from a previously determined BER associated with the metablock (at block 408). The method 400 may be performed at predetermined time intervals such as, for example, every fifteen minutes, every thirty minutes, every hour, every day, or other suitable interval. In some instances, the device controller 120 determines the change in the BER with respect to a BER determined at an immediate prior iteration of the method 400. However, in some instances, the change in the BER is determined with respect to a period of time greater than the iteration interval of the method 400. For example, the device controller 120 may determine the change in the BER with respect to a BER calculated a day prior to a current iteration of the method 400.

The method 400 includes determining, with the device controller 120, whether a temporal threshold associated with the programming of the metablock has been exceeded (at decision block 412). The temporal threshold indicates a shift in a cell voltage distribution ("CVD") of the metablock due to RTDR phenomena.

Figure 5:
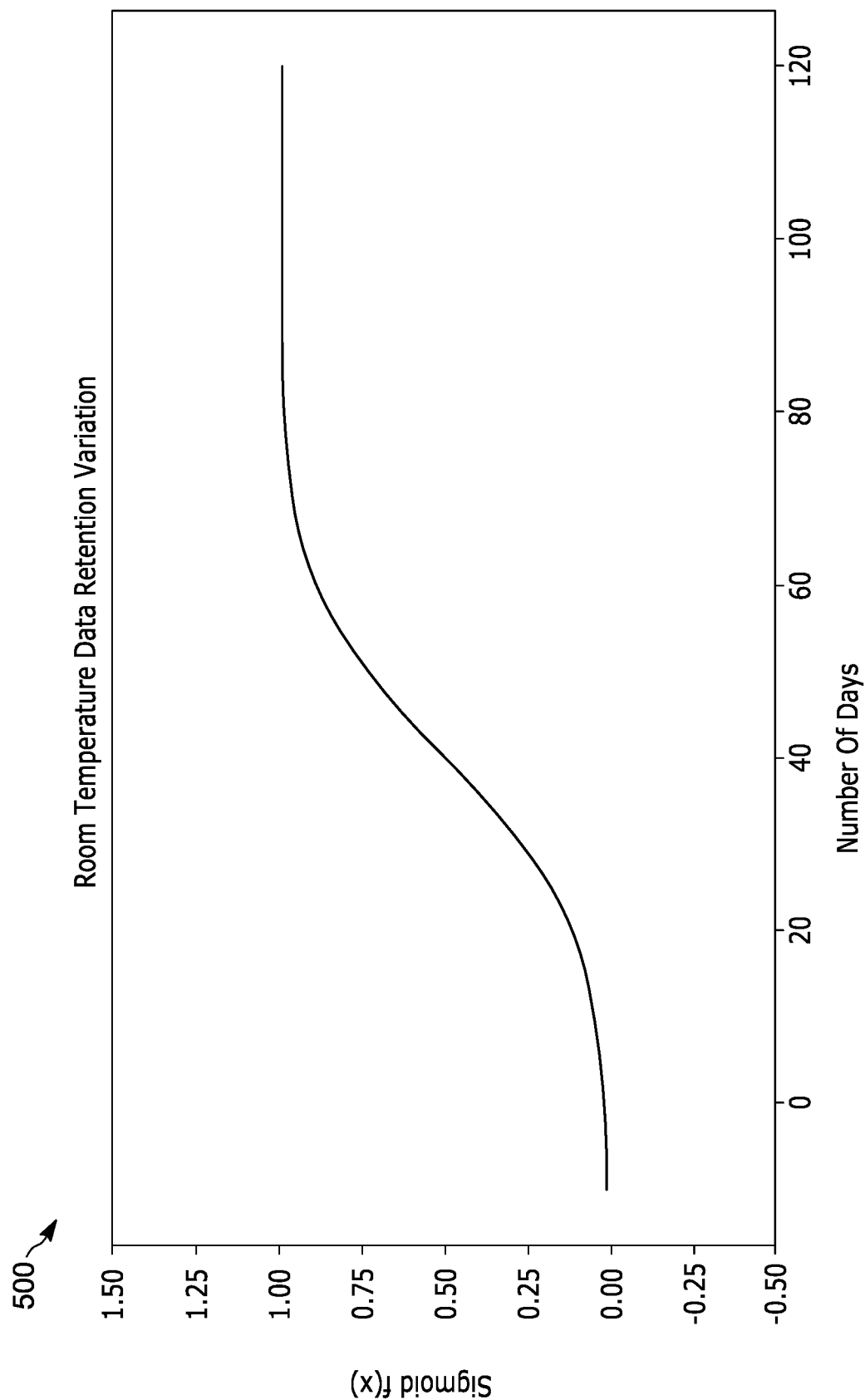
FIG. 5 is a graph illustrating a function associated with room temperature data retention ("RTDR") variation over time, in accordance with some embodiments of the disclosure.

In some instances, the device controller 120 determines whether the temporal threshold has been exceeded based on a function of the BER of the metablock over time. For example, FIG. 5 is a graph 500 of an example function illustrating RTDR phenomena for a metablock of an example memory 104. The function is defined, for example, as $f(x)=1/(1+\exp(-a*x))$, where "a" is a constant indicative of a change in BER of the metablock. For example, 'a' is a change in BER every day due to data retention in the metablock every week. In the illustrated example, 'a' is equal to 0.1 such that the function is further defined as: $f(x)=1/(1+\exp(-0.1*x))$. As illustrated in the graph 500, for an example of the memory 104, the change in BER begins increasing at a higher rate at approximately 20 days from the closing of the metablock. At approximately 60 days, the change in BER becomes stable.

Figure 6:
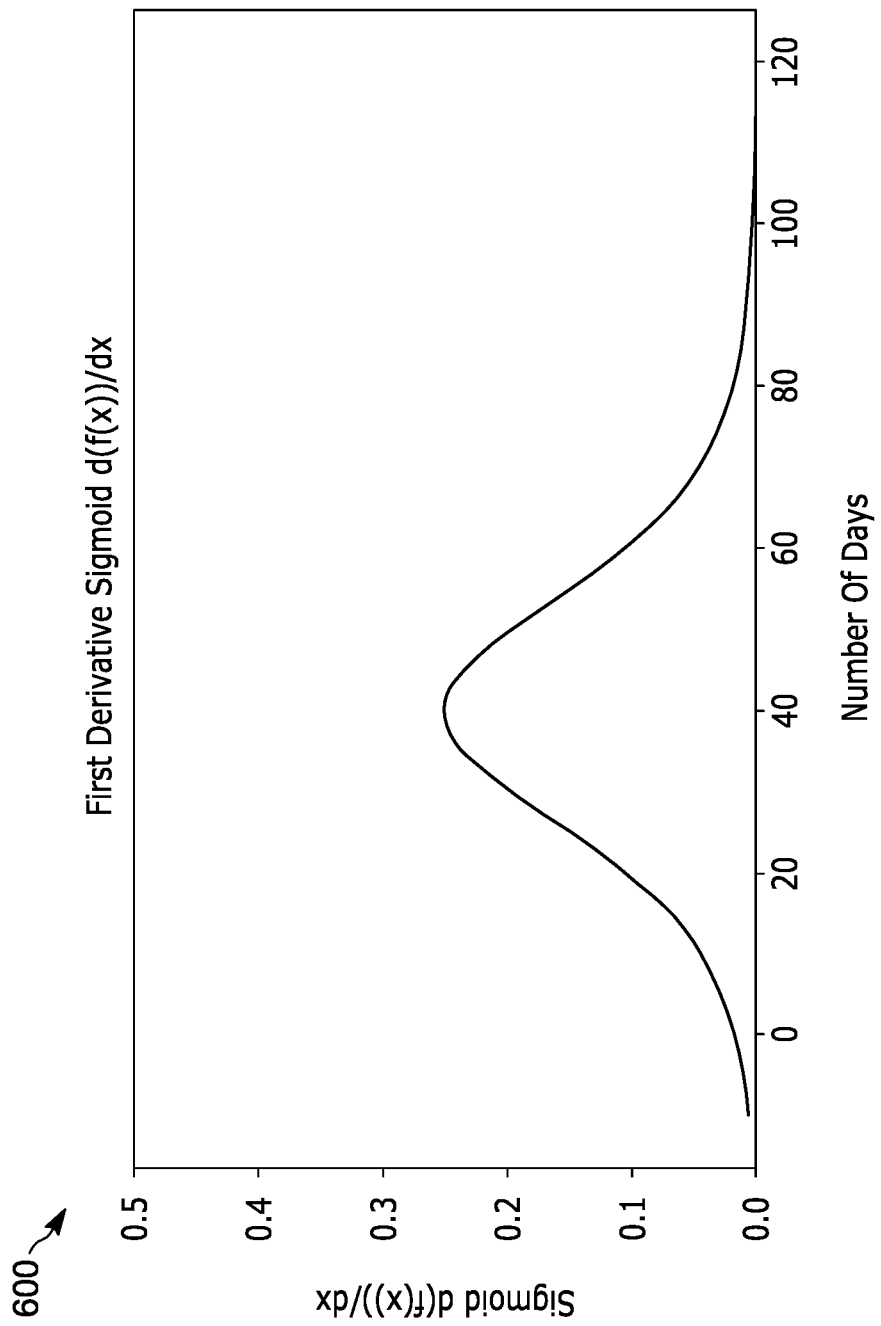
FIG. 6 is a graph illustrating a first derivative of a function associated with RTDR variation over time, in accordance with some embodiments of the disclosure.

The device controller 120 also determines a first derivative of the function f(x). For example, FIG. 6 illustrates an graph 600 of a first derivative of the function f(x), where the first derivative is defined as: $d(f(x))/dx=f(x)(1-f(x))$. The first derivative represents the slope of the function f(x). As illustrated in FIG. 6, at approximately 40 days, the slope of the function f(x) reaches its maximum and begins decreasing.

Figure 7:
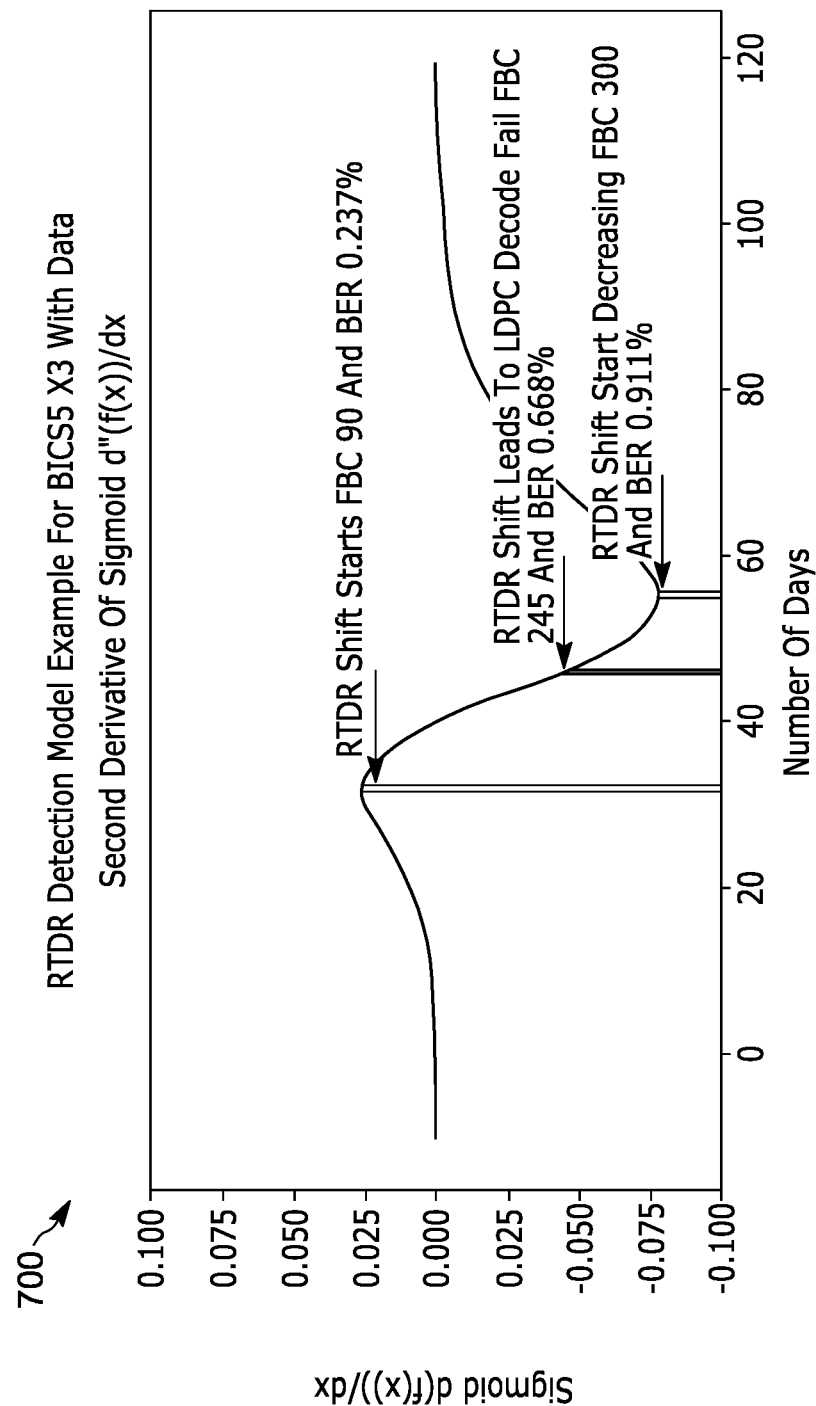
FIG. 7 is a graph illustrating a second derivative of a function associated with RTDR variation over time, in accordance with some embodiments of the disclosure.

The device controller 120 determines a second derivative of the function f(x). For example, FIG. 7 illustrates a graph 700 of a second derivative of the function f(x), where the second derivative is defined as, for example, $d''(f(x))/dx=f(x)^2*(1-f(x))*(1-2*f(x))$. The second derivative test is a systematic method of finding the absolute maximum and absolute minimum value of a real-valued function defined on a closed or bounded interval. For example, a function f(x) defined on a closed interval I, and having a point x=p belonging to the closed interval I is considered. Assuming that p is a critical point of the continuous function f (x), when second derivative is positive (e.g., $d''(f(x))/dx>0$), the function is concave up and having a minimum point. When second derivative is negative (e.g., $d''(f(x))/dx<0$), the function is concave down and having a maximum point.

During the interval between the maximum and minimum points, significant RTDR phenomena occurs in the memory 104. Therefore, during the interval between the maximum and minimum points, the device controller 120 detects RTDR phenomena to modify the read parameters associated with the metablock in order to prevent a LDPC decode failure on the metablock. For example, as illustrated in FIG. 7, using the second derivative, the device controller 120 may determine that CVD shift due to RTDR phenomena begins at approximately 30 days (one example of the temporal threshold). At an approximate start of the CVD shift indicated by the maximum point of the second derivative, the device controller 120 may determine that a fail bit count ("FBC") associated with one or more metablocks assigned to a particular TRT is 90 and a BER associated with one or more metablocks assigned to the TRT is 0.237%. At an approximate end of the RTDR phenomena indicated by the minimum point of the second derivative (e.g., when the CVD shift begins decreasing), the device controller 120 may determine that the FBC associated with the one or more metablocks is 300 and a BER associated with one or more metablocks is 0.911%. In the illustrated example, at a point in the interval between the maximum and minimum points (e.g., at approximately 45 days), the CVD shift due to RTDR phenomena causes a LDPC decode failure, where the FBC is 245 and the BER is 0.668%.

Using the second derivative, the device controller 120 may determine when to update the read parameters for reading the metablocks of a particular TRT. For example, in some instances, the temporal threshold corresponds to a point in time when the local maximum of the second derivative occurs. The device controller 120 may determine the second derivative at each iteration of the method 400. However, in some instances, the temporal threshold is stored in a lookup table ("LUT") of the memory 124. For example, the device controller 120 may determine or "look up" the temporal threshold associated with a start of the RTDR phenomena from the LUT based on known parameters of the data storage device 102 instead of using the function f(x) to determine the temporal threshold.

The device controller 120 may update the read parameters after the start of the CVD shift due to RTDR phenomena but before an LDPC decode failure occurs. For example, referring again to FIG. 4, the method 400 includes, in response to determining that the temporal threshold has been exceeded ("YES" at decision block 412), updating a counter based on the change in the BER from the previously determined BER. For example, the device controller 120 may determine whether the change in the BER from the previously determined BER exceeds a BER change threshold. For example, non-overlapping ranges of BERs may be organized into a plurality of BER regions such that each non-overlapping BER range is included in a respective BER region. The BER change threshold may correspond to a change in BER region of a predetermined number of BER regions. For example, the device controller 120 may determine that the change in BER exceeds the BER change threshold in response to determining that the BER has changed by at least two BER regions. In response to determining that the change in the BER exceeds the BER change threshold, the device controller 120 increments the counter.

The method 400 includes determining, with the device controller 120, whether the counter exceeds a count threshold (at decision block 420). The count threshold may be indicative of, for example, a change in BER corresponding to a CVD shift approaching a LDPC decode failure. In response to determining that the counter exceeds a count threshold ("YES" at decision block 420), the device controller 120 updates the read parameters for the metablock by reassigning the metablock to a different one of the plurality of TRTs associated with a respective different one of the plurality of thermal regions (at block 424). For example, the device controller 120 may initially assign the metablock to a first TRT associated with a first thermal region (at block 208 of the method 200). When the counter reaches the count threshold (at block 420), the device controller 120 may deactivate the first TRT for the metablock and reassign the metablock to a second TRT associated with a second thermal region.

As described above, each TRT of the plurality of TRTs is associated with a set of read parameters, and each set of read parameters is different from one another. Therefore, before a LDPC decode failure occurs, the device controller 120 shifts the TRT (one of the plurality of TRTs) to which the metablock is assigned, thereby shifting the read parameters associated with the metablock. In some instances, reassigning the metablock to a new TRT includes reducing the counter or otherwise resetting the counter to zero.

The periodic TRT update completes at block 432. For example, the periodic TRT update described with respect to the method 400 may terminate at block 432 after the read parameters are updated (at block 424) or after the device controller 120 determines that the temporal threshold associated with a programming of the metablock has not been exceeded ("NO" at decision block 412). However, it should be understood that additional steps may occur before or after block 428.

Referring again to FIG. 2, the method 200 includes receiving, with the device controller 120, a read request for the metablock from the host device 150 (at block 216). In response to receiving the read request, the device controller 120 reads the metablock using the set of read parameters associated with the TRT to which the metablock is assigned (at block 424). For example, when a periodic TRT update performed at block 212 results in the device controller 120 reassigning the metablock to a new TRT, the device controller 120 reads the metablock using the read parameters associated with the new TRT.

It is to be understood that the above description is intended to be illustrative and not restrictive. Many embodiments and applications other than the examples provide would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:
 a memory interface configured to interface with a non-volatile memory; and
 a controller configured to:
  select a metablock of the non-volatile memory for programming,
  program the metablock, wherein programming the metablock includes assigning the metablock to one of a plurality of thermal region tags ("TRTs") associated with a respective one of a plurality of thermal regions, and each TRT of the plurality of TRTs is associated with a respective set of read parameters,
  perform a periodic TRT update to detect a room temperature data retention ("RTDR") phenomena associated with the metablock, wherein the periodic TRT update includes:
   determining a bit error rate ("BER") associated with the metablock,
   determining a change in the BER from a previously determined BER associated with the metablock,
   in response to determining that a temporal threshold associated with a period of time after programming of the metablock has been exceeded, updating a counter based on the change in the BER from the previously determined BER,
   determining whether the counter exceeds a count threshold associated with detection of a RTDR phenomena, and
   in response to determining that the count threshold associated with the detection of a RTDR phenomena has been exceeded, reassigning the metablock to a different one of the plurality of TRTs associated with a respective different one of the plurality of thermal regions; and
  in response to receiving a read request for the metablock from an external electronic device, read the metablock using the respective set of read parameters associated with the TRT to which the metablock is assigned.

2. The device of claim 1,
wherein the temporal threshold corresponds to a shift in a cell voltage distribution ("CVD") of the metablock.

3. The device of claim 2, wherein, to update the counter based on the change in the BER from the previously determined BER, the controller is further configured to:
determine whether the change in the BER from the previously determined BER exceeds a BER change threshold, and
in response to determining that the change in the BER from the previously determined BER exceeds the BER change threshold, increment the counter.

4. The device of claim 2, wherein to determine whether the temporal threshold has been exceeded, the controller is further configured to:
determine a function of the change in the BER of the metablock over time,
determine a first derivative of the function,
determine a second derivative of the function, and
determine whether a local maximum of the second derivative has occurred, wherein the local maximum is indicative of the temporal threshold.

5. The device of claim 4, wherein the function is a function f(x) defined as: $f(x)=1/(1+\exp(-a*x))$, where 'a' is a constant indicative of a periodic change in BER of the metablock, and 'x' is elapsed time.

6. The device of claim 2, wherein to determine whether the temporal threshold has been exceeded, the controller is further configured to:
determine an amount of time elapsed since a programming of the metablock, and
determine whether the amount of time elapsed since the programming of the metablock has exceeded the temporal threshold, wherein the temporal threshold is a predetermined value.

7. The device of claim 6, wherein the temporal threshold is stored in a lookup table ("LUT").

8. A method performed by a data storage device, the method comprising:
selecting a metablock of a non-volatile memory for programming;
programing the metablock, wherein programming the metablock includes assigning the metablock to one of a plurality of thermal region tags ("TRTs") associated with a respective one of a plurality of thermal regions, and each TRT of the plurality of TRTs is associated with a respective set of read parameters;
performing a periodic TRT update to detect a room temperature data retention ("RTDR") phenomena associated with the metablock, wherein performing the periodic TRT update includes:
determining a bit error rate ("BER") associated with the metablock,
determining a change in the BER from a previously determined BER associated with the metablock,
in response to determining that a temporal threshold associated with a period of time after programming of the metablock has been exceeded, updating a counter based on the change in the BER from the previously determined BER,
determining whether the counter exceeds a count threshold associated with detection of a RTDR phenomena, and
in response to determining that the count threshold associated with the detection of a RTDR phenomena has been exceeded, reassigning the metablock to a different one of the plurality of TRTs associated with a respective different one of the plurality of thermal regions; and
in response to receiving a read request for the metablock from an external electronic device, reading the metablock using the respective set of read parameters associated with a TRT to which the metablock is assigned.

9. The method of claim 8, wherein
the temporal threshold corresponds to a shift in a cell voltage distribution ("CVD") of the metablock.

10. The method of claim 9, wherein updating the counter based on the change in the BER from the previously determined BER includes:
determining whether the change in the BER from the previously determined BER exceeds a BER change threshold, and
in response to determining that the change in the BER from the previously determined BER exceeds the BER change threshold, incrementing the counter.

11. The method of claim 9, wherein determining whether the temporal threshold has been exceeded includes:
determining a function of the change in the BER of the metablock over time,
determining a first derivative of the function,
determining a second derivative of the function, and
determining whether a local maximum of the second derivative has occurred, wherein the local maximum is indicative of the temporal threshold.

12. The method of claim 11, wherein the function is a function f(x) defined as: $f(x)=1/(1+\exp(-a*x))$, where 'a' is a constant indicative of a periodic change in BER of the metablock, and 'x' is elapsed time.

13. The method of claim 9, wherein determining whether the temporal threshold has been exceeded includes:
determining an amount of time elapsed since a programming of the metablock, and
determining whether the amount of time elapsed since the programming of the metablock has exceeded the temporal threshold, wherein the temporal threshold is a predetermined value.

14. The method of claim 13, wherein the temporal threshold is stored in a lookup table ("LUT").

15. An apparatus comprising:
means for selecting a metablock of a non-volatile memory for programming;
means for programing the metablock, wherein programming the metablock includes assigning the metablock to one of a plurality of thermal region tags ("TRTs") associated with a respective one of a plurality of thermal regions, and each TRT of the plurality of TRTs is associated with a respective set of read parameters;
means for performing a periodic TRT update to detect a room temperature data retention ("RTDR") phenomena associated with the metablock, wherein performing the periodic TRT update includes:
determining a bit error rate ("BER") associated with the metablock,
determining a change in the BER from a previously determined BER associated with the metablock,
in response to determining that a temporal threshold associated with a period of time after programming of the metablock has been exceeded, updating a counter based on the change in the BER from the previously determined BER, and
determining whether the counter exceeds a count threshold associated with detection of a RTDR phenomena; and in response to determining that the count threshold associated with the detection of a RTDR phenomena has been exceeded, reassigning the metablock to a different one of the plurality of TRTs associated with a respective different one of the plurality of thermal regions; and means for, in response to receiving a read request for the metablock from an external electronic device, reading the metablock using the respective set of read parameters associated with a TRT to which the metablock is assigned.

16. The apparatus of claim 15, wherein the temporal threshold corresponds to a shift in a cell voltage distribution ("CVD") of the metablock.

17. The apparatus of claim 16, wherein updating the counter based on the change in the BER from the previously determined BER includes:

determining whether the change in the BER from the previously determined BER exceeds a BER change threshold, and in response to determining that the change in the BER from the previously determined BER exceeds the BER change threshold, incrementing the counter.

* * * * *